United States Patent [19]
Boianjiu

[11] Patent Number: 5,738,468
[45] Date of Patent: Apr. 14, 1998

[54] SHIM FOR CUTTING TOOL WITH REPLACEABLE CUTTING INSERT

[75] Inventor: Gideon Boianjiu, Kfar Havradim, Israel

[73] Assignee: Iscar, Ltd., Tefen, Israel

[21] Appl. No.: 778,222

[22] Filed: Jan. 8, 1997

Related U.S. Application Data

[62] Division of Ser. No. 734,368, Oct. 16, 1996, which is a continuation of Ser. No. 341,616, filed as PCT/EP93/03713, Dec. 29, 1993, abandoned.

[30] Foreign Application Priority Data

Dec. 30, 1992 [IL] Israel .................................. 104273

[51] Int. Cl.$^6$ ............................................. B23B 27/16
[52] U.S. Cl. ...................... 407/103; 407/113; 407/107
[58] Field of Search ............................. 407/103, 113, 407/102, 107, 120

[56] References Cited

U.S. PATENT DOCUMENTS

| | | | |
|---|---|---|---|
| 2,848,789 | 8/1958 | Friedline | 407/113 X |
| 2,870,523 | 1/1959 | Richard | 407/113 X |
| 3,829,943 | 8/1974 | Bartoszevicz et al. | 407/103 X |
| 4,189,264 | 2/1980 | Kraemer | 407/2 |
| 4,934,879 | 6/1990 | van Barneveld | 407/66 |
| 5,011,340 | 4/1991 | Pettersson et al. | 407/114 |
| 5,046,899 | 9/1991 | Nishi | 407/102 |
| 5,348,065 | 9/1994 | Meyer | 407/113 X |
| 5,469,902 | 11/1995 | Sharp et al. | 407/113 X |

FOREIGN PATENT DOCUMENTS

| | | |
|---|---|---|
| 639 418 A1 | 2/1995 | European Pat. Off. |
| 2023648 | 11/1970 | Germany |
| 1199468 | 12/1985 | U.S.S.R. |

*Primary Examiner*—Daniel W. Howell
*Assistant Examiner*—Henry W. H. Tsai
*Attorney, Agent, or Firm*—Pennie & Edmonds LLP

[57] ABSTRACT

A shim for use in a metal cutting tool comprised of a tool holder and a double sided cutting insert. The insert has rake surfaces formed in the corners of upper and lower surfaces of the insert with a recess formed in the corners. The shim is used to retain the insert in the tool holder. The shim has a shape and lateral dimensions substantially corresponding to the insert. The shim has at least one projection which mates with the recess. When the insert and shim are clamped in the tool holder, the projection adjacent an operative pair of insert cutting edges bears against the walls of the associated recess, effectively supporting the insert in this region. This results in the inoperative lower cutting edges being spaced from the shim.

15 Claims, 9 Drawing Sheets

SHIM FOR CUTTING TOOL WITH REPLACEABLE CUTTING INSERT

RELATED APPLICATIONS

This application is a divisional application of pending application, Ser. No. 08/734,368, filed Oct. 16, 1996, which is a continuation of application Ser. No. 08/341,616, filed on Nov. 17, 1994, now abandoned, which is a national phase entry of PCT/EP93/03713, filed on Dec. 29, 1993.

FIELD OF THE INVENTION

This invention relates to metal cutting tools and, in particular, metal cutting tools having replaceable cutting inserts for use: for example, in milling, drilling, boring or turning operations.

BACKGROUND OF THE INVENTION

The cutting inserts for use with such metal cutting tools have generally been formed as single sided or double sided inserts, the latter, of course, being preferred seeing that it allows for doubling the number of cutting edges which are available for use. Such replaceable cutting inserts are clampingly retained in an insert retaining pocket formed in a tool holder with the insert itself resting either directly on a base wall of the pocket, or via a correspondingly shaped and sized shim. Such known cutting inserts are formed with rake surfaces which are generally provided with chip forming grooves- Where double sided cutting inserts are involved, the mounting of the insert must be such as to ensure that the lower cutting edge (i.e. the cutting edge not being at that stage operative) is protected against damage and, for this purpose, it is generally ensured that the construction of the lower surface of the insert and/or the adjacent bearing surface of the pocket wall or shim is such that a certain degree of spacing is maintained between the lowermost cutting edge and the adjacent bearing surface. However, the provision of the chip forming groove in the respective rake surfaces of the insert carries with it the consequence that the lower surface of the insert, which is provided with such a chip forming groove, bears on the corresponding surface of the shim or base wall of the pocket only in those portions of the lower surface inwardly of the chip forming groove.

It will therefore be realized that, with the exertion of machining forces on the insert and in view of the fact that the lower surface of the insert is only supported at its inner base portions, a bending moment is exerted on the insert which, especially in heavy duty conditions, could result in a fracture of the insert. It will be realized that the wider the chip forming groove, the greater is the beating surface of the insert displaced inwardly from the cutting edge and the greater is the bending moment exerted on the insert. Such widening of the chip forming groove is generally necessary in heavy duty conditions in order to form chips of relatively large cross-sectional shape and this, of itself, results in increasing machining forces and a corresponding increase in the deleterious bending moment which is exerted on the insert.

It is for this reason that the use of double sided inserts has been considerably restricted, especially in the case of double sided inserts having a negative cutting geometry.

It has been proposed in DE 2023648 to provide a machine cutting tool having a double faced insert and provided in its upper and lower surfaces with recesses in which a mechanical chip former is fitted. The tool is provided with a shim, which is formed with an upper bearing surface shaped to correspond with that of the recess formed on the lower surface of the insert. This proposal, however, carries with it the requirement that the shape of the shim's bearing surface must match with the shape of the adjacent recess, or otherwise it cannot be ensured that the cutting insert will always be seated accurately on the shim. Furthermore, with use the uppermost insert surface is subjected to wear and, when the insert is reversed so that this surface bears on the bearing surface of the shim, an accurate placing of the insert within the pocket is no longer possible.

It is therefore an object of the present invention to provide a new and improved metal cutting tool having a double sided cutting insert in which means are provided for substantially reducing, or avoiding, the above-referred-to disadvantages.

BRIEF SUMMARY OF THE INVENTION

According to the present invention, there is provided a metal cutting tool comprising a tool holder; a cutting insert retaining pocket formed in said tool holder and defined by a pocket base wall and a pocket side wall; a cutting insert of substantially prismatic shape having upper and lower surfaces and side relief surfaces; said upper and lower surfaces being each formed with a rake surface and a bearing surface; cutting edges defined between each side surface and an adjacent rake surface; chip forming means formed in said rake surfaces adjacent said cutting edges; pairs of adjacent side surfaces and their associated rake surfaces defining between them insert corners; said insert being indexable so as to present successive pairs of operative cutting edges having common insert corners; a shim substantially corresponding in shape and lateral dimensions to said insert located on said pocket base wall and supporting said insert; and clamping means for clampingly retaining said insert and shim within said pocket with said insert being firmly clamped at a first side portion thereof remote from a pair of operative cutting edges against said pocket side wall and, at its lower surface, adjacent said operative cutting edges against said shim;

characterized in that there is formed in the rake surfaces of each of said upper and lower surfaces respectively in the region of each of said corners a recess and that said shim is formed in an upper surface thereof adjacent at least one corner thereof a projection adapted to fit into a corresponding recess of the adjacent insert surface so that when the insert and shim are clamped in said pocket the projection adjacent the operative pair of cutting edges bears against the walls of the associated recess so as effectively to support the insert in this region with said operative cutting edges spaced from said shim.

With such a metal cutting tool, the fact that the lower surface of the insert is always supported in the region adjacent the operative pair of cutting edges, as well as being supported by its inner bearing surface, ensures that any bending moment exerted on the insert by the machining forces, is minimal and in this way the dangers of fracture of the insert are significantly reduced.

BRIEF DESCRIPTION OF THE DRAWINGS

For a better understanding of the present invention and to show how the same may be carried out in practice, reference will now be made to the accompanying drawings, in which.

DETAILED DESCRIPTION OF PREFERRED EMBODIMENT

Figure 1:
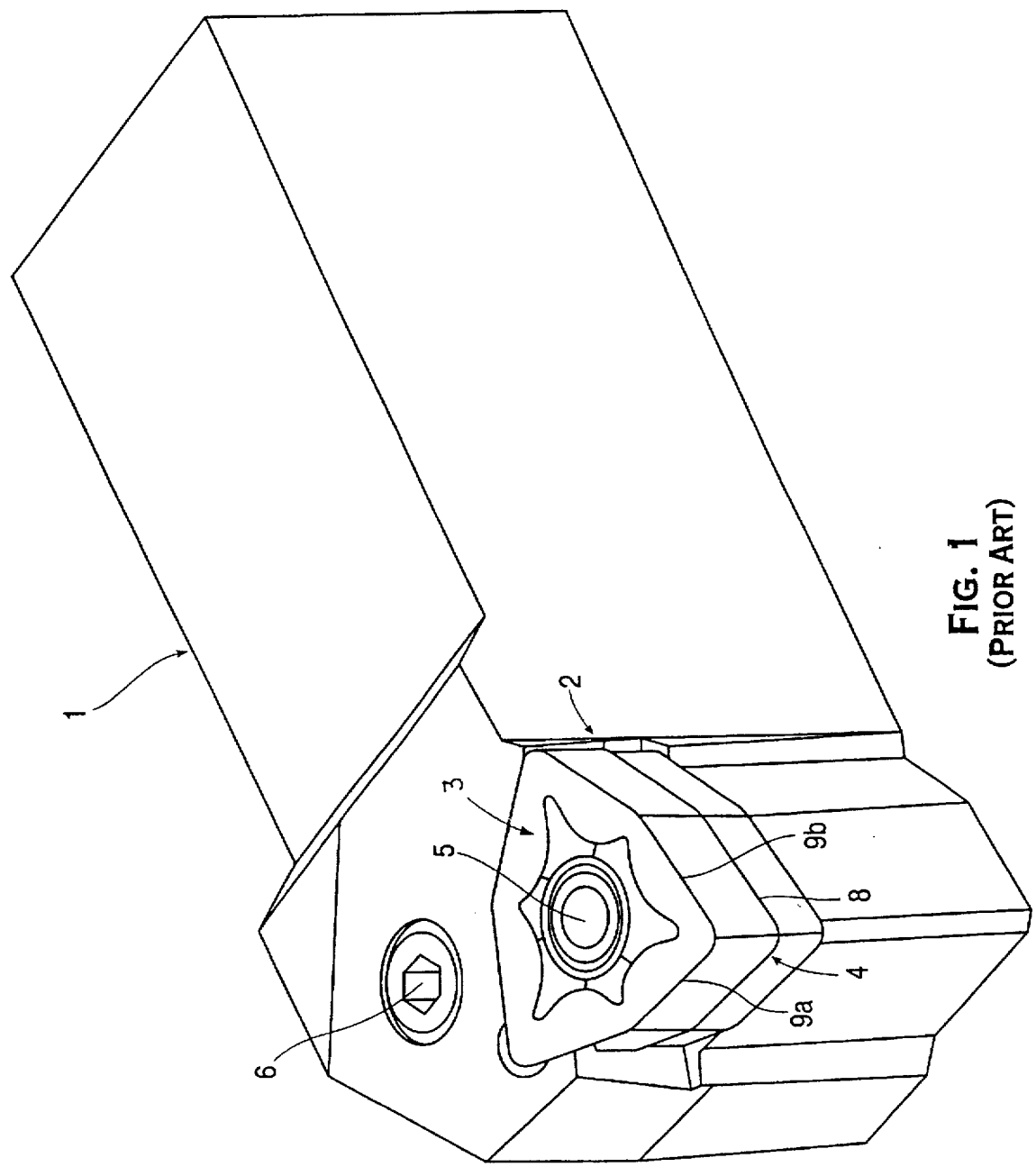
FIG. 1 is a perspective view of a metal cutting tool of the kind to which the present invention relates.
Figure 2:
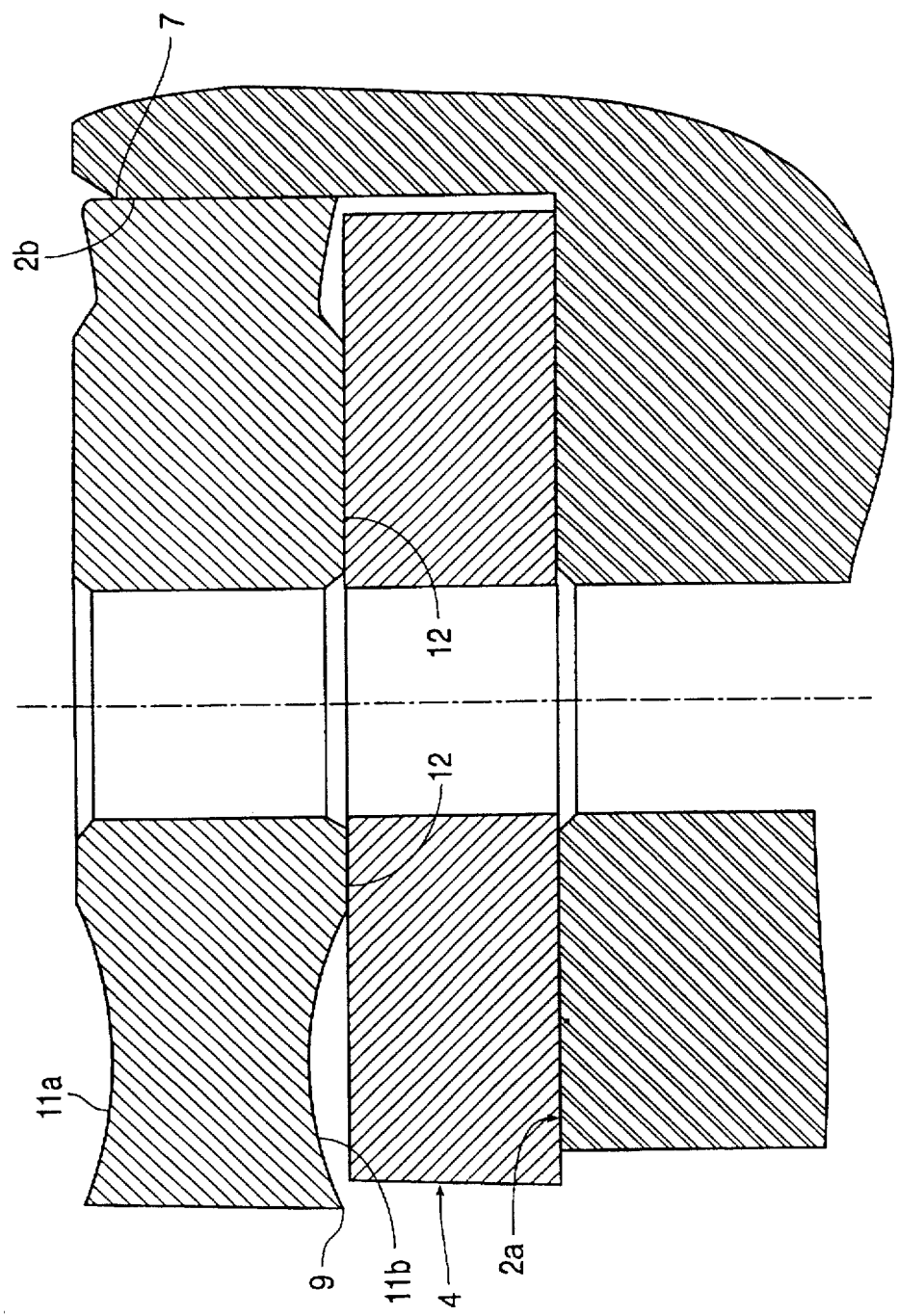
FIG. 2 is a cross-sectional view of a portion of a cutting tool of the kind shown in FIG. 1, but having a known double sided metal cutting insert.
Figure 3:
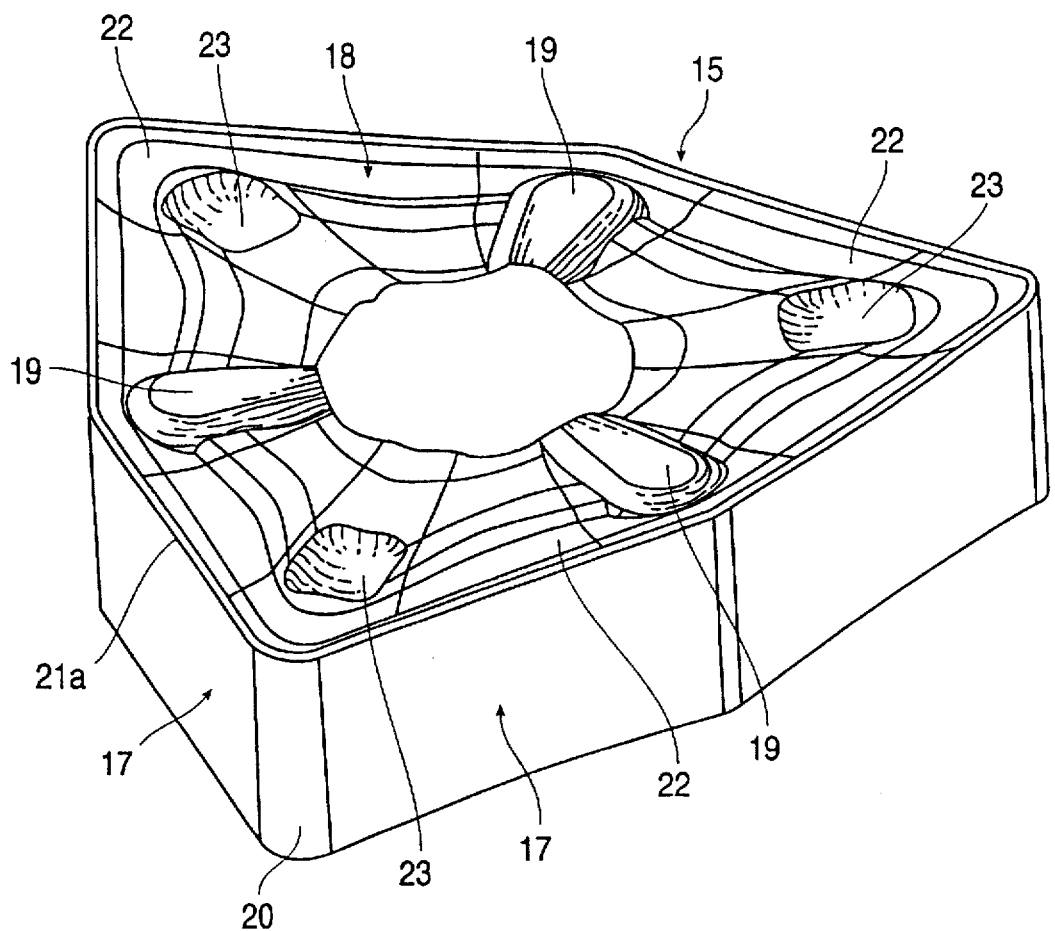
FIG. 3 is a perspective view of a double sided metal cutting insert for use with a cutting tool in accordance with the present invention.
Figure 4:
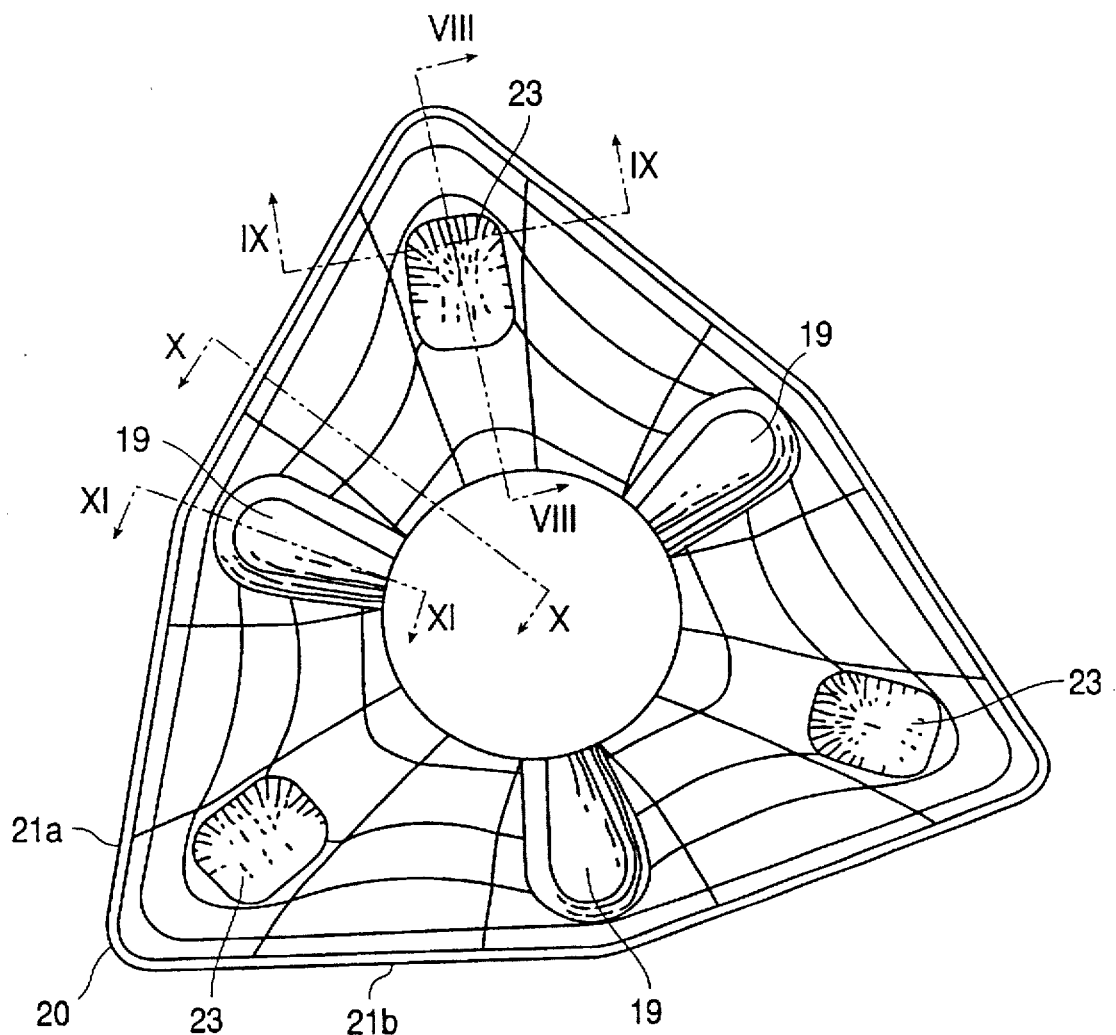
FIG. 4 is a plan view from above of the metal cutting insert shown in FIG. 3.
Figure 7:
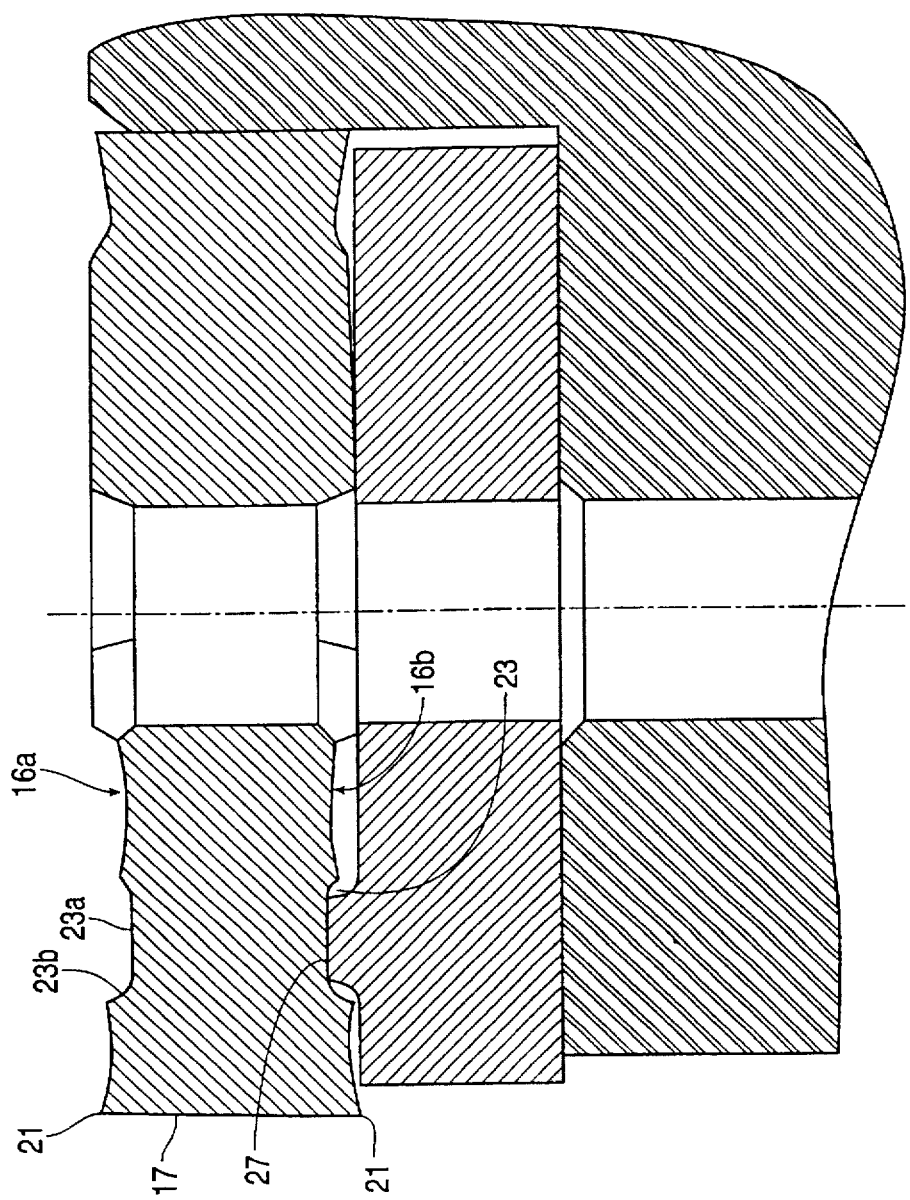
FIG. 7 is a cross-sectional view of the insert and shim shown in FIG. 6, when mounted on the tool holder.

As seen in FIGS. 1, 2 and 7 of the drawings, the metal cutting tool of the kind to which the present invention is applied comprises a tool holder 1 formed with an insert retaining pocket 2 defined by a pocket base wall 2a and a pocket side wall 2b with the side wall 2b being slightly inclined towards the base wall 2a. A metal cutting insert 3 is located within the pocket 2, resting on a correspondingly dimensioned and shaped shim 4. The insert 3 and shim 4 are retained within the pocket 2 by a retaining lever 5 of known construction and by clamping means 6 (also of known construction), so that a side wall 7 of the cutting insert 3 is effectively clamped against the side wall 2b of the pocket, and so that the insert 3 is clamped at a lower surface 8 thereof adjacent a pair of operative cutting edges 9a and 9b clamped against the adjacent surface of the shim 4.

Referring to FIG. 2 of the drawings, it will be seen that with a known double sided insert having opposite rake surfaces thereof formed with chip forming grooves 11a and 11b, formed respectively on the upper and lower surfaces of the insert, and with the lowermost cutting edges 9 spaced from the adjacent surface of the shim 4 (so as to protect these cutting edges), the insert essentially bears on the shim 4 via bearing surfaces 12 which are significantly displaced inwardly with respect to the cutting edge 9. In consequence, machining forces acting on the insert give rise to a bending moment which can result in the fracture of the insert. It is for this reason, and has been explained above, that the use of such double sided inserts has not been successful.

Reference will now be made to the remaining FIGS. 3 through 11 of the drawings, which illustrate how the specially-designed insert and shim in accordance with the present invention allow for the effective use of double sided cutting inserts. As seen in the drawings, and in particular in FIGS. 3 through 7 thereof, a cutting insert 15 is formed with upper and lower surfaces 16a and 16b (see FIG. 7) and side relief surfaces 17. Each of the upper and lower surfaces 16a and 16b is formed with a rake surface 18 and radially directed bearing surfaces 19. Adjacent pairs of relief flanks 17 define between them an insert corner 20. Defined between each pair of adjacent relief flanks 17 and the corresponding rake surfaces 18 is a pair of operative cutting edges 21a and 21b. Formed in the rake surfaces 18 and extending around these rake surfaces adjacent to the cutting edges 21 is a chip former groove 22.

Figure 10:
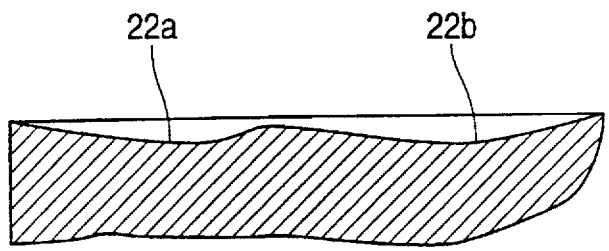
Figure 11:
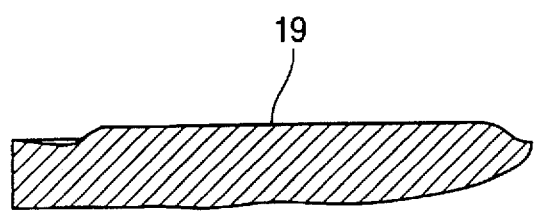

Formed in each of the rake surfaces 18, respectively adjacent the three corners 20 thereof, are recesses 23 located adjacent each pair of operative cutting edges 21a and 21b. Each recess 23 is, as seen in FIG. 7 of the drawings, formed with a base wall 23a and side tapering walls 23b. The recess 23 is in fact of truncated, trapezoidal shape. As can be seen in FIG. 10 of the drawings, the chip former groove 22 comprises a first, outer chip former groove 22a and a successive, inner chip former groove 22b. Furthermore, as seen in FIG. 11 of the drawings, the bearing surfaces 19 are constituted by upper substantially planar plateaux.

Figure 5:
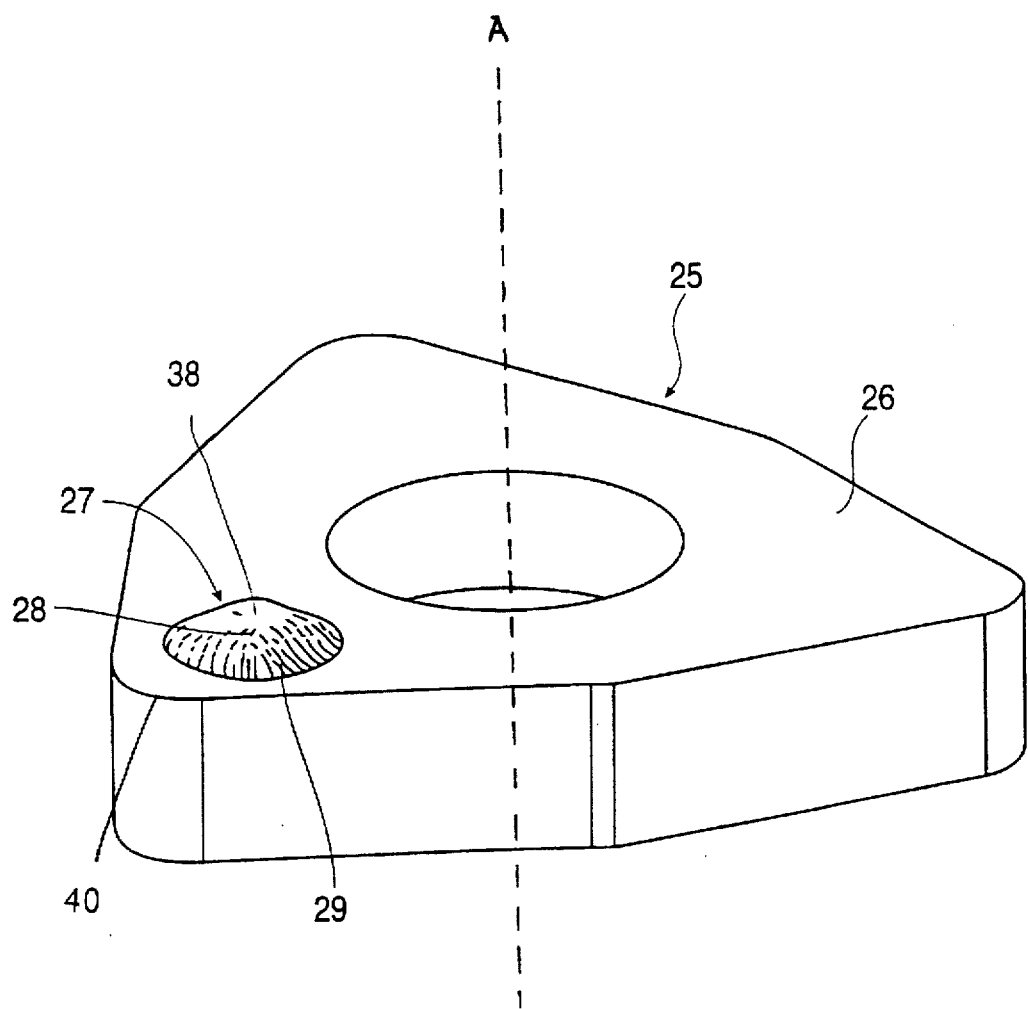
FIG. 5 is a perspective view of an insert support shim for use in a metal cutting tool in accordance with the present invention.

Referring now to FIG. 5 of the drawings, there is here shown a shim 25 which has a similar shape to that of the insert 15 but is of slightly lesser lateral dimensions. Formed in an upper surface 26 of the shim and adjacent a corner thereof is a projection 27 which is also essentially of truncated, trapezoidal shape having an upper surface 28 and tapering side surfaces 29. In the preferred embodiment, the projection, and its uppermost portion 38, are spaced apart from an outermost portion 40 of the shim corner to which they are closest.

Figure 6:
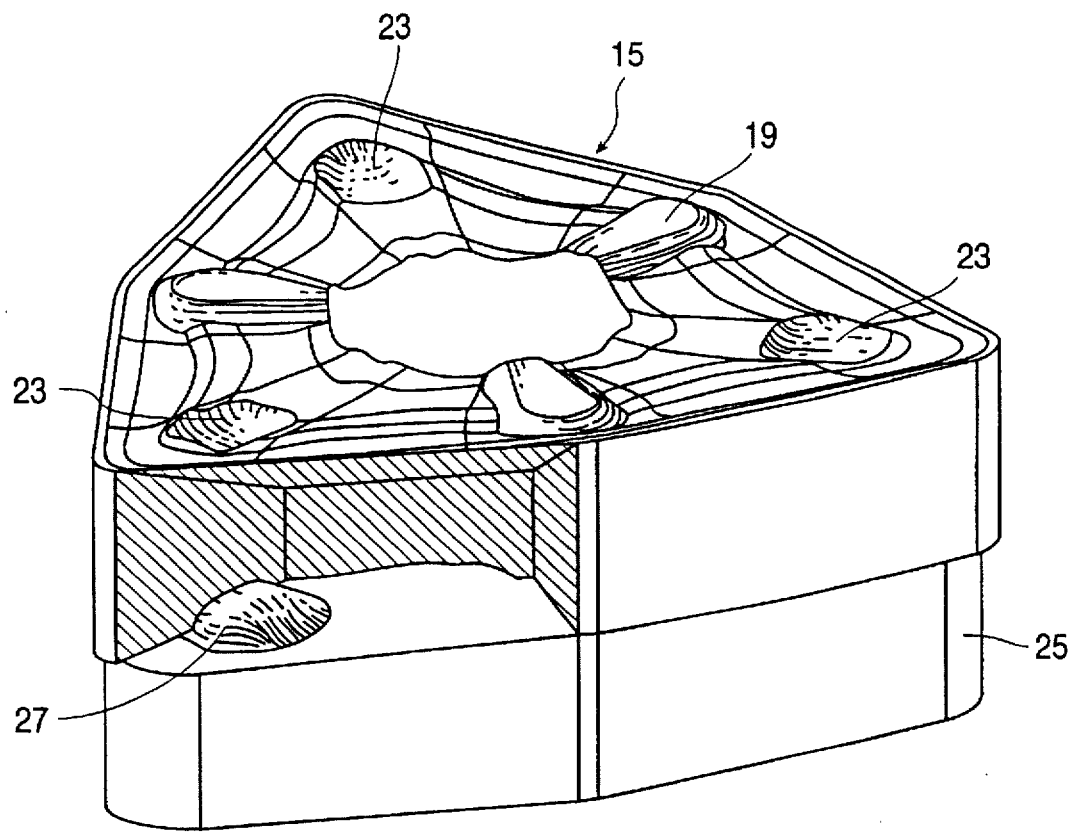
FIG. 6 is a partially-sectioned perspective view of the cutting insert shown in FIGS. 3 and 4 when resting on the the shim shown in FIG. 5.

As seen in FIGS. 6 and 7 of the drawings, the shim 25 is so disposed within the insert retaining pocket so that its projection 27 is located within the recess 23 adjacent the operative pair of cutting edges, 21a, 21b. The relative dimensions of the recess and projection are such that, as shown in the drawings, the upper planar surface 28 of the projection abuts the inner planar base 23a of the recess. An alternative possibility is for the respective tapering side walls of the recess and projection to abut. It will be understood that considerations of tolerances render it difficult, if not impossible, to ensure abutting by both the tapering surfaces and the planar surfaces of the recess and projection.

With the arrangement as shown, the insert lower surface 16b is firmly supported adjacent the operative corner thereof by the abutment of the projection 27 and the inner planar base 23a of the recess 23 and, on either side thereof, by the adjacent bearing surfaces 19 which bear on the planar surface 26 of the shim 25. In this way, it is ensured that the insert is effectively supported in the region directly adjacent the operative cutting edges, and this effectively prevents the generation of a bending moment which could result in the fracture of the insert.

Whilst in the specific embodiment just described the shim 25 is provided with a single projection 27 adjacent one Of its corners, the shim could equally well be provided with additional projections opposite the remaining corners, provided that it is ensured that an unambiguous support is always effected between the projection and the recess opposite the operative cutting edges of the insert.

Figure 8:
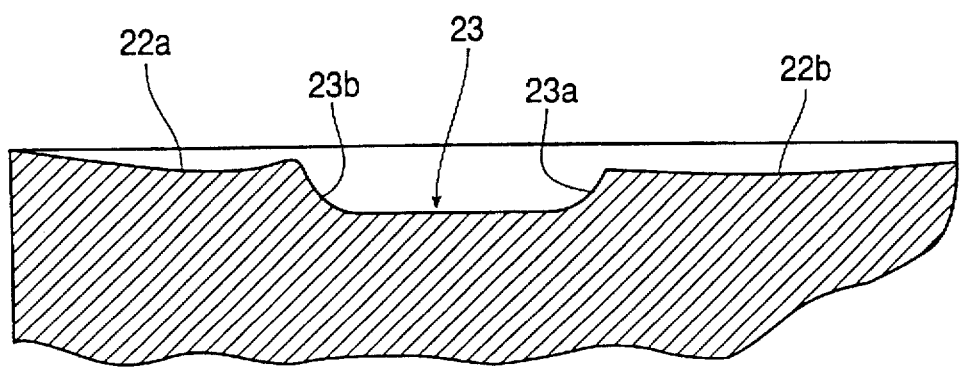
FIGS. 8, 9, 10 & 11 are respective cross-sectional views of the insert shown in FIG. 4, taken respectively along the lines VIII:VIII, IX:IX, X:X and XI:XI.
Figure 9:
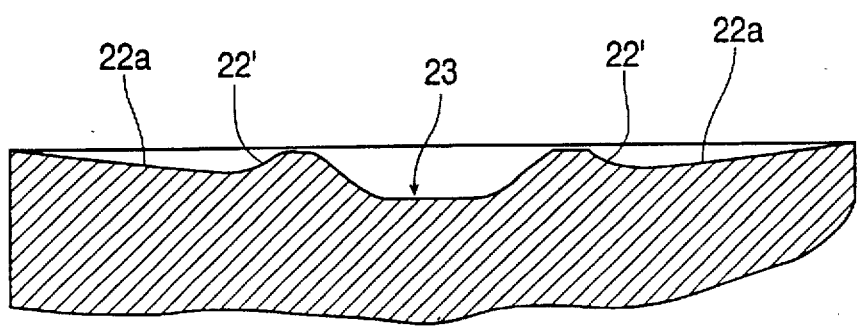

The location and dimensions of the recess 23 are so chosen as to ensure that during machining, the generated chips do not penetrate into the recess 23 and damage its supporting surfaces. Thus, as shown in FIGS. 8 and 9 of the drawings, the base wall 23a of the recess 23 is located well below the associated cutting edge, and in this way it is ensured that in operation the chips are deflected by the adjacent deflector wall of the chip former groove, thereby preventing their entering the recesses.

I claim:

1. A shim for use in a cutting tool assembly, said cutting tool assembly comprising a tool holder formed with a cutting insert retaining pocket having a pocket base wall designed to support said shim and an indexable double sided cutting insert to be supported by said shim, said shim comprising:

a substantially prismatic body substantially corresponding in shape and in size to said pocket base wall and having a plurality of shim corners and an upper shim surface with at least one insert supporting projection formed thereon;

wherein said insert supporting projection has an uppermost portion disposed adjacent to only one of said plurality of shim corners.

2. A shim for use in a cutting tool assembly, said cutting tool assembly comprising a tool holder formed with a cutting insert retaining pocket having a pocket base wall designed to support said shim and an indexable double sided cutting insert to be supported by said shim, said shim comprising:

a substantially prismatic body substantially corresponding in shape and in size to said wall and having a plurality of shim corners and an upper shim surface;

wherein the number of said shim corners is three and an insert supporting projection is located on said upper shim surface at each of said shim corners.

3. The shim of claim 1, wherein the insert supporting portion has a trapezoidal shape formed with an upper surface and tapered side surfaces.

4. The shim of claim 3, wherein the insert supporting projection is spaced apart from an outermost portion of its corresponding shim corner.

5. The shim of claim 1, wherein the insert supporting projection is spaced apart from an outermost portion of its corresponding shim corner.

6. The shim of claim 2, wherein each insert supporting portion has a trapezoidal shape formed with an upper surface and tapered side surfaces.

7. The shim of claim 6, wherein each insert supporting projection is spaced apart from an outermost portion of its corresponding shim corner.

8. The shim of claim 2, wherein each insert supporting projection is spaced apart from an outermost portion of its corresponding shim corner.

9. A shim for use with a cutting insert, said shim comprising:

a substantially prismatic body having a plurality of shim corners and an upper shim surface with at least one insert supporting projection formed thereon, said insert supporting projection having an uppermost portion disposed adjacent to only one of said plurality of shim corners.

10. The shim of claim 9, wherein the number of shim corners is three and an insert supporting projection is located on said upper shim surface at each of said shim corners.

11. The shim of claim 10, wherein each insert supporting projection has a trapezoidal shape formed with an upper surface and tapering side surfaces.

12. The shim of claim 11, wherein each insert supporting projection is spaced apart from an outermost portion of its corresponding shim corner.

13. The shim of claim 9, wherein the insert supporting projection has a trapezoidal shape formed with an upper surface and tapering side surfaces.

14. The shim of claim 13, wherein the insert supporting projection is spaced apart from an outermost portion of its corresponding shim corner.

15. The shim of claim 9, wherein the insert supporting projection is spaced apart from an outermost portion of its corresponding shim corner.

* * * * *